US009860402B2

(12) United States Patent
Yabuki et al.

(10) Patent No.: US 9,860,402 B2
(45) Date of Patent: Jan. 2, 2018

(54) RECORDING APPARATUS CAPABLE OF SWITCHING RECORDING SPEED AND NON-TRANSITORY STORAGE MEDIUM STORING INSTRUCTIONS EXECUTABLE BY THE SAME

(71) Applicant: Brother Kogyo Kabushiki Kaisha, Nagoya-shi, Aichi-ken (JP)

(72) Inventors: Tomoyasu Yabuki, Nagoya (JP); Motohiro Tsuboi, Nagoya (JP); Yuji Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/084,664

(22) Filed: Mar. 30, 2016

(65) Prior Publication Data

US 2016/0295032 A1 Oct. 6, 2016

(30) Foreign Application Priority Data

Mar. 30, 2015 (JP) ................................ 2015-069256

(51) Int. Cl.
*H04N 1/00* (2006.01)
*H04N 1/21* (2006.01)
(Continued)

(52) U.S. Cl.
CPC ........ *H04N 1/0057* (2013.01); *B41J 13/0027* (2013.01); *B65H 7/04* (2013.01);
(Continued)

(58) Field of Classification Search
CPC .. H04N 1/0057; H04N 1/0032; H04N 1/2195; H04N 2201/0094; B65H 7/04; B65H 2513/10; G05B 15/02
See application file for complete search history.

(56) References Cited

U.S. PATENT DOCUMENTS

2010/0129100 A1* 5/2010 Oyoshi .............. G03G 15/2064
399/53
2014/0253655 A1* 9/2014 Sai .......................... B41J 11/007
347/104

FOREIGN PATENT DOCUMENTS

JP 2001-080135 A 3/2001
JP 2001-287377 A 10/2001
(Continued)

OTHER PUBLICATIONS

English machine translation JP2003341184.*

*Primary Examiner* — Iriana Cruz
(74) *Attorney, Agent, or Firm* — Banner & Witcoff, Ltd.

(57) ABSTRACT

A recording apparatus includes a controller configured to: decrease the number of recording pages which is stored in a storage in response to completion of recording on a recording medium on a page-by-page basis; increase the number of recording pages in response to an increase in an amount of image data in the storage; determine whether the number of recording pages is greater than or equal to a first number; control a drive source and a recording device to convey the recording medium at a first speed and perform recording when the number of recording pages is less than the first number; and control the drive source and the recording device to convey the recording medium at a second speed greater than the first speed and perform the recording when the number of recording pages is greater than or equal to the first number.

7 Claims, 3 Drawing Sheets

(51) Int. Cl.
*B65H 7/04* (2006.01)
*B65H 29/12* (2006.01)
*B65H 43/00* (2006.01)
*B41J 13/00* (2006.01)
*G03G 15/00* (2006.01)

(52) U.S. Cl.
CPC ........... *B65H 29/125* (2013.01); *B65H 43/00* (2013.01); *H04N 1/0032* (2013.01); *H04N 1/2195* (2013.01); *B65H 2513/108* (2013.01); *B65H 2601/521* (2013.01); *B65H 2801/06* (2013.01); *G03G 15/5008* (2013.01); *G03G 2215/0196* (2013.01); *H04N 2201/0094* (2013.01)

(56) References Cited

FOREIGN PATENT DOCUMENTS

| JP | 2003-341184 A | 12/2003 | |
|----|---------------|---------|---|
| JP | 2003341184 | * 12/2003 | .............. B41J 29/38 |

* cited by examiner

RECORDING APPARATUS CAPABLE OF SWITCHING RECORDING SPEED AND NON-TRANSITORY STORAGE MEDIUM STORING INSTRUCTIONS EXECUTABLE BY THE SAME

CROSS REFERENCE TO RELATED APPLICATION

The present application claims priority from Japanese Patent Application No. 2015-069256, which was filed on Mar. 30, 2015, the disclosure of which is herein incorporated by reference in its entirety.

BACKGROUND

Technical Field

The following disclosure relates to a recording apparatus (a recording apparatus capable of performing high-speed recording in particular) and a non-transitory storage medium storing a plurality of instructions executable by a processor of the recording apparatus.

Description of the Related Art

In recent years, a recording speed has been increasing in a recording apparatus such as an ink-jet printer. For example, some ink-jet recording apparatuses use an elongated line head having a width larger than or equal to that of a sheet, and the recording speed in such ink-jet recording apparatuses is considerably greater than that in serial ink-jet recording apparatuses using a recording head mounted on a carriage which is reciprocated during recording in a widthwise direction of a sheet.

SUMMARY

To perform high-speed recording, the recording medium needs to be conveyed at a high speed, which requires a high speed of rotation of a motor that serves as a drive source of a conveying mechanism for conveying the recording medium. However, noise generated in a recording apparatus increases with increase in speed of rotation of the motor, leading to an annoyance to users near the recording apparatus in some cases. Thus, high-speed recording and lower noise cannot be achieved at the same time. Incidentally, users using a recording apparatus capable of performing high-speed recording do not always prefer the high-speed recording and may prefer the lower noise to the high-speed recording. The inventors of the present application have found that users tend to give a higher priority to the high-speed recording than to the lower noise in the case where the number of recording pages is large and give a higher priority to the lower noise than to the high-speed recording in the case where the number of recording pages is small. This tendency is strong in offices in particular.

Accordingly, an aspect of the disclosure relates to a recording apparatus capable of optimizing a recording speed to reduce noise with convenience to users, and to a non-transitory storage medium storing a plurality of instructions executable by a processor of the recording apparatus.

In one aspect of the disclosure, a recording apparatus includes: a recording device configured to record an image on a recording medium; a conveying mechanism configured to convey the recording medium such that the recording medium passes through a recording position at which the recording device records an image on the recording medium; a drive source configured to drive the conveying mechanism; a storage configured to store (i) image data to be managed on a page-by-page basis and representative of images to be respectively recorded on recording media by the recording device and (ii) the number of recording pages which is the number of pages for which the images are recorded on the recording media by the recording device; and a controller. The controller is configured to: decrease the number of recording pages which is stored in the storage, in response to completion of recording on the recording medium by the recording device on the page-by-page basis; increase the number of recording pages which is stored in the storage, in response to an increase in an amount of the image data stored in the storage, on the page-by-page basis; determine whether the number of recording pages which is stored in the storage is greater than or equal to a first number; control the drive source to convey the recording medium at a first speed and control the recording device to perform recording on the recording medium when the controller determines that the number of recording pages is less than the first number; and control the drive source to convey the recording medium at a second speed greater than the first speed and control the recording device to perform the recording on the recording medium when the controller determines that the number of recording pages is greater than or equal to the first number.

In another aspect of the disclosure, a non-transitory storage medium stores a plurality of instructions to be executed by a processor of a recording apparatus. The recording apparatus includes: a recording device configured to record an image on a recording medium; a conveying mechanism configured to convey the recording medium such that the recording medium passes through a recording position at which the recording device records an image on the recording medium; a drive source configured to drive the conveying mechanism; and a storage configured to store (i) image data to be managed on a page-by-page basis and representative of images to be respectively recorded on recording media by the recording device and (ii) the number of recording pages which is the number of pages for which the images are recorded on the recording media by the recording device. The plurality of instructions, when executed by the processor, cause the recording apparatus to perform: decreasing the number of recording pages which is stored in the storage, in response to completion of recording on the recording medium by the recording device on the page-by-page basis; increasing the number of recording pages which is stored in the storage, in response to an increase in an amount of the image data stored in the storage, on the page-by-page basis; determining whether the number of recording pages which is stored in the storage is greater than or equal to a first number; causing the drive source to convey the recording medium at a first speed and causing the recording device to perform recording on the recording medium when the number of recording pages is less than the first number; and causing the drive source to convey the recording medium at a second speed greater than the first speed and causing the recording device to perform the recording on the recording medium when the number of recording pages is greater than or equal to the first number.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENTS

Figure 1:
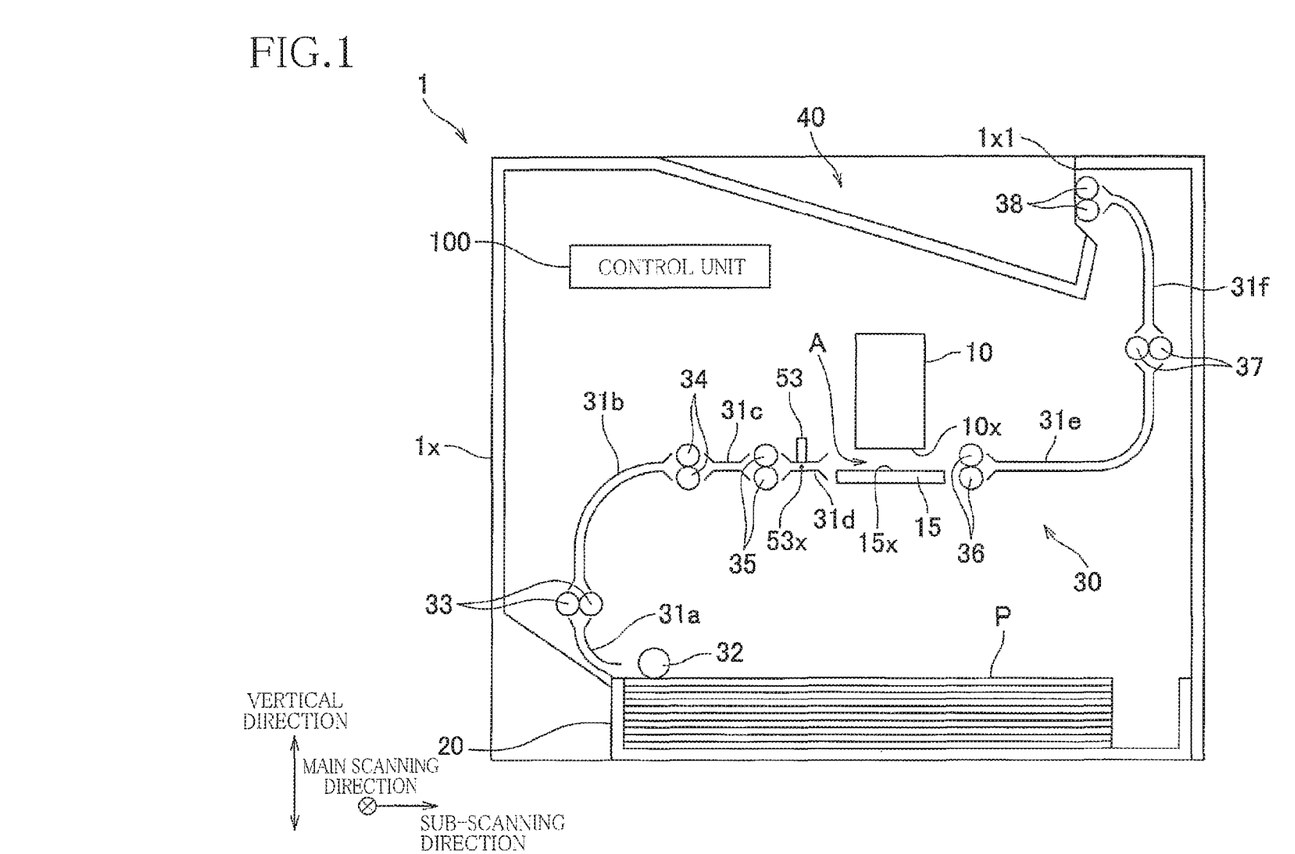
FIG. 1 is a side view illustrating an interior of an ink-jet printer according to one embodiment.

Hereinafter, there will be described one embodiment by reference to the drawings. As illustrated in FIG. 1, an ink-jet printer 1 according to one embodiment includes a housing 1x having a rectangular parallelepiped shape. Devices and components arranged in the housing 1x include an ink-jet head 10, a platen 15, a sheet storage 20, a conveying mechanism 30, a sheet sensor 53, and a control unit 100 as one example of a controller. A sheet receiver 40 is provided on a top plate of the housing 1x. The housing 1x has an output opening 1x1 for discharging a recording medium in the form of a sheet P onto the sheet receiver 40.

The head 10 is a line head elongated in a main scanning direction. A lower surface 10x of the head 10 has a multiplicity of ejection openings for ejection of ink.

The platen 15 is a flat plate and disposed under the head 10. An upper surface 15x of the platen 15 and the lower surface 10x of the head 10 are spaced apart from each other so as to face each other.

A space formed between the lower surface 10x of the head 10 and the upper surface 15x of the platen 15 corresponds to a recording position A. The lower surface 10x of the head 10 is opposed to the sheet P passing through the recording position A. The lower surface 10x is elongated in a direction (the main scanning direction) perpendicular to a conveying direction (a sub-scanning direction) in which the sheet P is conveyed by the conveying mechanism 30 when the sheet P passes through the recording position A.

The sheet storage 20 is a tray capable of accommodating a plurality of sheets P and mountable on and removable from the housing 1x.

The conveying mechanism 30 includes guides 31a-31f, a sheet-supply roller 32, and roller pairs 33-38. The conveying mechanism 30 conveys each sheet P from the sheet storage 20 along a conveyance path. Each of the guides 31a-31f has a pair of guide plates spaced apart from each other in its thickness direction. The sheet-supply roller 32 is disposed so as to contact a surface of the uppermost one of the sheets P stored in the sheet storage 20. Each of the roller pairs 33-38 has two rollers contacting each other. The conveyance path is constituted by (a) a space formed between the pair of guide plates of each of the guides 31a-31f, (b) a contacting point between the rollers of each of the roller pairs 33-38, and (c) the space (the recording position A) between the lower surface 10x of the head 10 and the upper surface 15x of the platen 15. Each of the roller pairs 33-37 is disposed between corresponding two of the guides 31a-31f spaced apart from each other along the conveyance path. The roller pair 38 is disposed downstream of the guide 31f. The sheet-supply roller 32 and one of each of the roller pairs 33-38 are drive rollers which are driven and rotated by a conveying motor 30M (see FIG. 2) controlled by the control unit 100. The other of each of the roller pairs 33-38 is a driven roller which is rotated by the rotation of the one roller.

The two rollers of each of the roller pairs 33-38 are respectively rotated in directions reverse to each other, with the sheet P being nipped therebetween.

The sheet sensor 53 outputs a signal indicating the presence or absence of the sheet P at a sensing position 53x in the conveyance path. The sheet sensor 53 outputs an ON signal when the sheet P is present at the sensing position 53x. The sheet sensor 53 outputs an OFF signal when the sheet P is absent at the sensing position 53x. The sensing position 53x is located just upstream of the head 10 in the conveying direction. The signals output from the sheet sensor 53 are used in processings at S16, S18, and S19 which will be described below, for example.

Figure 2:
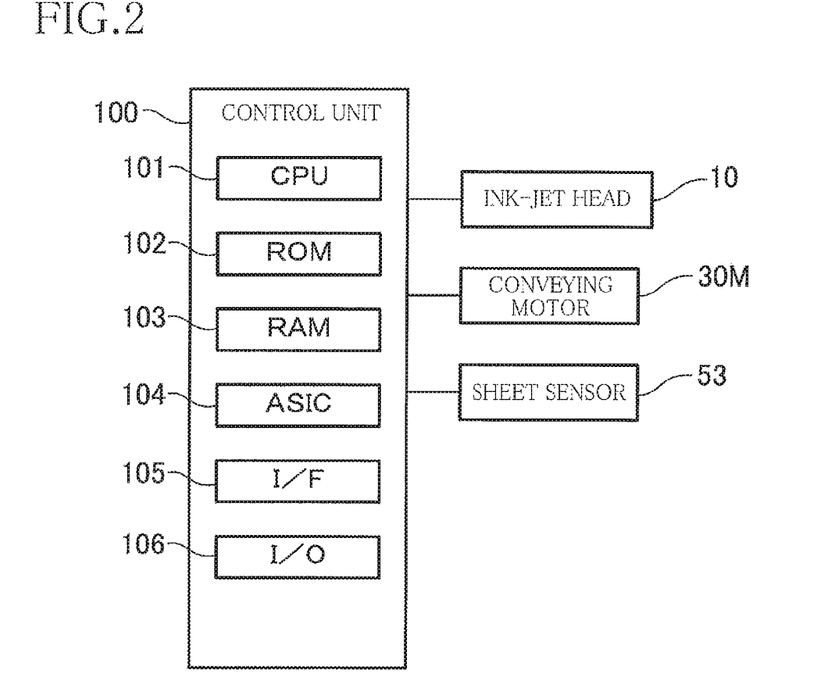
FIG. 2 is a block diagram illustrating an electric configuration of the ink-jet printer according to the one embodiment.

As illustrated in FIG. 2, the control unit 100 is a central processing unit (CPU) 101 constituted by a computing device, a read only memory (ROM) 102, a random access memory (RAM) 103, an application specific integrated circuit (ASIC) 104, an interface (I/F) 105, and an input/output port (I/O) 106. The ROM 102 stores fixed data for programs to be executed by the CPU 101, for example. The RAM 103 temporarily stores data required for the CPU 101 to execute the programs, such as setting information about a conveying speed, image data, and the number of recording pages. The ASIC executes rewriting and sorting of image data and other processings such as a signal processing and an image processing. The interface 105 transmits and receives data to and from an external device such as a PC connected to the printer 1. The input/output port 106 transmits and receives signals to and from various kinds of sensors including the sheet sensor 53. The CPU 101 is electrically connected to the devices of the control unit 100 other than the CPU 101 and executes control based on data received from the devices.

The setting information about the conveying speed is information about a setting of a speed at which the sheet P is conveyed. In the present embodiment, the conveying speed is set to any one of a high speed and a low speed.

The image data is data representative of an image to be recorded on the sheet P by the head 10 and managed on a page-by-page basis (i.e., in units of pages of the sheets P). The image data stored in the RAM 103 is data for which image processing has been executed by the ASIC 104. Specifically, the image data indicates an amount of ink to be ejected from each ejection opening of the head 10 for each pixel. Pixels are elements constituting an image to be formed on the sheet P and arranged in matrix so as to correspond to an image forming region on the sheet P. In the present embodiment, the number of gray levels is four, and the ROM 102 stores four kinds of data which respectively correspond to "zero", "small", "medium", and "large" each as an amount of ink for forming one pixel. Each of the ejection openings is assigned with one of data respectively corresponding to "zero", "small", "medium", and "large".

The number of recording pages is the number of pages to be recorded on the sheets P based on the image data. The number of recording pages which is stored in the RAM 103 is reduced upon completion of image recording on the sheet P by the head 10 on the page-by-page basis. The number of recording pages which is stored in the RAM 103 is increased upon increase in an amount of image data which is stored in the RAM 103 on the page-by-page basis. Specifically, the CPU 101 executes a recording-page-number increasing process illustrated in FIG. 3 and a recording process illustrated in FIG. 4 in parallel.

Figure 3:
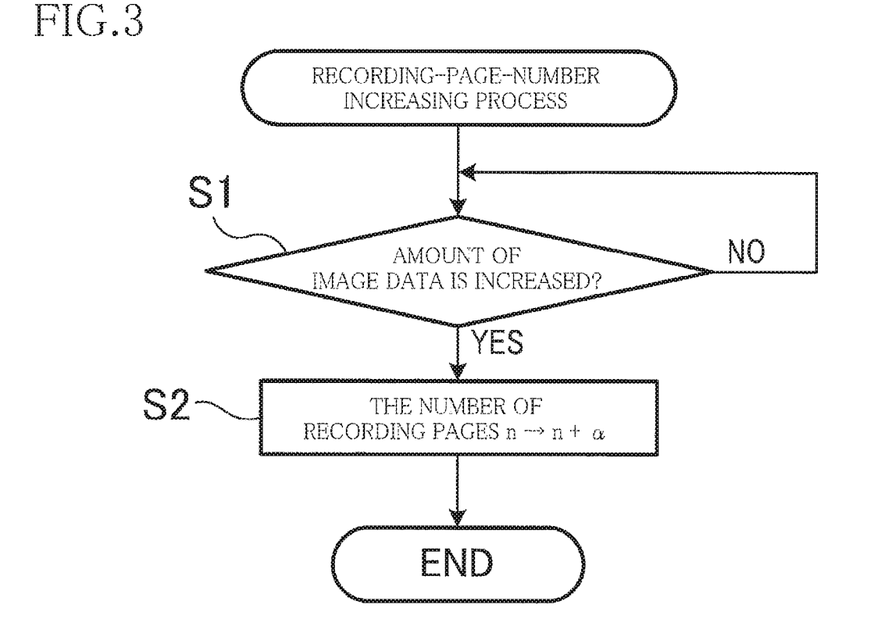
FIG. 3 is a flow chart illustrating a recording-page-number increasing process to be executed by a CPU in the one embodiment.

The recording-page-number increasing process illustrated in FIG. 3 begins with S1 at which the CPU 101 determines whether the amount of the image data which is stored in the RAM 103 is increased on the page-by-page basis. When the amount of the image data which is stored in the RAM 103 is not increased on the page-by-page basis (S1: NO), the CPU 101 repeats the processing at S1. When the amount of the image data which is stored in the RAM 103 is increased on the page-by-page basis (S1: YES), the CPU 101 at S2 adds the number of pages a (which is a natural number) corresponding to an amount of increase in the image data, to the number of recording pages n (which is an integer greater than or equal to zero) to obtain the number of recording pages n+α, and then the CPU 101 stores the number of recording pages n+α into the RAM 103, and this flow ends.

Figure 4:
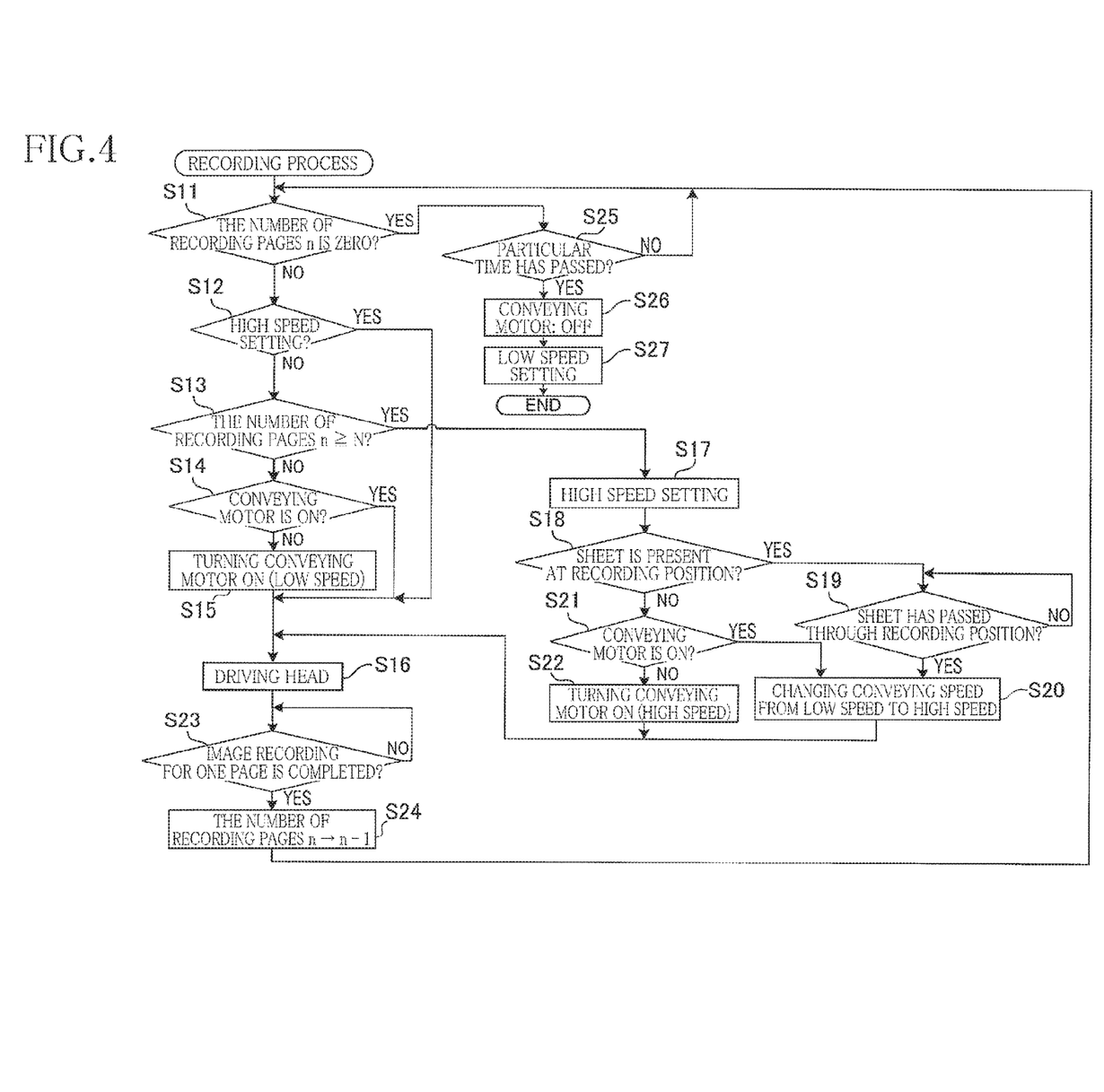
FIG. 4 is a flow chart illustrating a recording process to be executed by the CPU in the one embodiment.

The recording process illustrated in FIG. 4 begins with S11 at which the CPU 101 determines whether the number of recording pages n which is stored in the RAM 103 is zero. When the number of recording pages n which is stored in the RAM 103 is not zero (S11: NO), the CPU 101 at S12 determines whether the setting information about the conveying speed which is stored in the RAM 103 indicates a high speed setting.

When the setting information about the conveying speed which is stored in the RAM 103 does not indicate the high speed setting but is a low speed setting (S12: NO), the CPU 101 at S13 determines whether the number of recording pages n which is stored in the RAM 103 is greater than or equal to a particular number N (which is a natural number greater than or equal to two). The particular number N is one example of a first number. When the number of recording pages n is not greater than or equal to the particular number N (that is, the number of recording pages n is less than the particular number N) (S13: NO), the CPU 101 at S14 determines whether the conveying motor 30M is in an ON state, that is, the sheet is being conveyed.

When the conveying motor 30M is not in the ON state (S14: NO), the CPU 101 at S15 establishes the ON state of the conveying motor 30M by driving the conveying motor 30M at a speed corresponding to the low speed. As a result, the uppermost one of the sheets P in the sheet storage 20 is supplied at the low speed. After the processing at S15, the CPU 101 at S16 controls the head 10 to eject the ink from the ejection openings of the head 10 to record an image on the sheet P when the sheet P conveyed by the conveying mechanism 30 passes through the recording position A.

When the conveying motor 30M is in the ON state (that is, the sheet is being conveyed) (S14: YES), the CPU 101 executes a processing at S16. Also in this case, the sheet P is conveyed and recorded at the low speed.

When the setting information about the conveying speed which is stored in the RAM 103 indicates the high speed setting (S12: YES), the CPU 101 executes the processing at S16. In this case, the sheet P is conveyed and recorded at the high speed.

When the number of recording pages n is greater than or equal to the particular number N (S13: YES), the CPU 101 at S17 updates the setting information about the conveying speed which is stored in the RAM 103 from the low speed setting to the high speed setting. After S17, the CPU 101 at S18 determines whether the sheet P is present at the recording position A. When the sheet P is present at the recording position A (S18: YES), the CPU 101 at S19 determines whether the sheet P has passed through the recording position A.

When the sheet P has not passed through the recording position A (S19: NO), the CPU 101 repeats the processing at S19. When the sheet P has passed through the recording position A (S19: YES), the CPU 101 at S20 controls the conveying motor 30M to change the conveying speed from the low speed to the high speed when it is detected that the sheet P has passed through the recording position A. After S20, the CPU 101 executes the processing at S16. In this case, the preceding sheet P (i.e., the sheet P determined at S19 to have passed through the recording position A) is to be conveyed and recorded at the low speed, but the next sheet P is to be conveyed and recorded at the high speed.

It is noted that the determinations at S18 and S19 may be executed based on various parameters such as a signal output from the sheet sensor 53, a speed of rotation of the conveying motor 30M, and the length of the sheet P along the conveyance path.

When the sheet P is absent at the recording position A (S18: NO), the CPU 101 at S21 determines whether the conveying motor 30M is in the ON state, that is, the sheet is being conveyed.

When the conveying motor 30M is in the ON state (S21: YES), the CPU 101 executes the processing at S20.

When the conveying motor 30M is not in the ON state (S21: NO), the CPU 101 at S22 establishes the ON state of the conveying motor 30M by driving the conveying motor 30M at a speed corresponding to the high speed. As a result, the uppermost one of the sheets P in the sheet storage 20 is supplied at the high speed. After the processing at S22, the CPU 101 executes the processing at S16. In this case, the sheet P is conveyed and recorded at the high speed.

After the processing at S16, the CPU 101 at S23 determines whether the image recording on the sheet P is completed on the page-by-page basis, based on the amount of the image data which is stored in the RAM 103 and positional information on the sheet P which is obtained by the signal output from the sheet sensor 53, for example. When the image recording on the sheet P is not completed on the page-by-page basis (S23: NO), the CPU 101 repeats the processing at S23. When the image recording on the sheet P is completed on the page-by-page basis (S23: YES), the CPU 101 at S24 decrements the number of recording pages n by one and stores the decremented number (n−1) into the RAM 103 as the number of recording pages n, and this flow returns to S11.

When the number of recording pages n which is stored in the RAM 103 is zero (S11: YES), the CPU 101 at S25 determines whether a particular length of time has passed from the timing when the CPU 101 determines that the number of recording pages n is zero. When the particular length of time has not passed (S25: NO), this flow returns to S11.

When the particular length of time has passed (S25: YES), the CPU 101 at S26 switches the state of the conveying motor 30M to an OFF state when the conveying motor 30M is in the ON state, and keeps the OFF state when the conveying motor 30M is in the OFF state. After S26, when the setting information about the conveying speed which is stored in the RAM 103 indicates the high speed setting, the CPU 101 at S27 updates the setting information to the low speed, and when the setting information about the conveying speed which is stored in the RAM 103 indicates the low speed, the CPU 101 at S27 keeps the setting information, and this flow ends.

In the present embodiment as described above, when the number of recording pages n which is stored in the RAM 103 is less than the particular number N (that is, when the number of recording pages n is small), the CPU 101 in the recording process drives the conveying motor 30M to convey the sheet P at the low speed (as one example of a first speed) (S13: NO, and S14-S16). This operation achieves reduced noise. When the number of recording pages n which is stored in the RAM 103 is greater than or equal to the particular number N (that is, when the number of recording pages n is large), the CPU drives the conveying motor 30M to convey the sheet P at the high speed (as one example of a second speed) (S13: YES, and S17-S22). This operation achieves high-speed recording. Thus, one of the low-speed conveyance (for reduced noise) and the high-speed conveyance (for high-speed recording) is selectively performed based on the number of recording pages n which is stored in the RAM 103, thereby achieving optimized recording speed and reduced noise, leading to convenience to users.

In the case where the CPU 101 in the recording process determines that the number of recording pages n is greater than or equal to the particular number N, and image recording is started by the head 10 for the sheet P conveyed at the high speed (the second speed), the CPU 101 controls the conveying motor 30M and the head 10 to convey the sheet P at the high speed (the second speed) and records an image on the sheet P (S12: YES, and S16) even when the number of recording pages n decreases to a value less than the particular number N in the state in which the conveying motor 30M is in the ON state, that is, in a state in which a driving force continues to be supplied from the conveying motor 30M to the conveying mechanism 30. This configuration reliably achieves high-speed recording in recording performed successively on a plurality of sheets P in one job, when compared with the case where the speed of conveyance of the sheet P is switched from the high speed (the second speed) to the low speed (the first speed) during the recording on the sheets P.

When the CPU 101 determines that the number of recording pages n is greater than or equal to the particular number N, and recording is started on the sheet P conveyed at the high speed (the second speed), and thereafter the particular length of time has passed from the timing when the number of recording pages n is decreased to zero (S25: YES) in the recording process, the CPU 101 controls the conveying motor 30M and the head 10 to convey the sheet P at the low speed (the first speed) and record an image on the sheet P until the CPU 101 thereafter determines that the number of recording pages n is greater than or equal to the particular number N (S27, S11: YES, S2: NO, and S13). In this configuration, when a job in which the sheet P is conveyed at the high speed (the second speed) is completed, the conveying speed for the sheet P is switched to the low speed (the first speed). This operation can reduce the noise caused if the high speed (the second speed) is kept even though the number of recording pages n is less than the particular number N after completion of one job.

The image data stored in the RAM 103 is data for which the image processing has been executed by the ASIC 104. This configuration allows the recording process to be speedily executed using the image data which is stored in the RAM 103 and for which the image processing has been executed.

In the case where the number of recording pages n is changed from a value less than the particular number N to a value greater than or equal to the particular number N, and the sheet P is located at the recording position A at the timing of this change (S13: YES, S17, and S18: YES) in the recording process, when it is thereafter detected that the sheet P is absent at the recording position A, that is, it is thereafter detected that the sheet P has passed through the recording position A, the CPU 101 controls the conveying motor 30M to switch the conveying speed for the sheet P from the low speed (the first speed) to the high speed (the second speed) (S19: YES, and S20). In the case where the conveying speed for the sheet P is switched before the sheet P passes through the recording position A, a recording quality for the sheet P may deteriorate. However, the above-described configuration can reduce the problem.

The lower surface 10A of the head 10 is elongated in the direction perpendicular to the conveying direction (i.e., in the main scanning direction). This configuration can more reliably achieve high-speed recording.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

The number of recording pages is decremented by one each time when recording by the recording device is completed on a page-by-page basis in the above-described embodiment. However, the number of recording pages may be decremented by two or more when recording for a plurality of pages is completed. Three or more conveying speeds may be set as the conveying speed instead of the above-described two conveying speeds. The image data stored in the storage device may not be data for which the image processing has been executed.

The determination of whether the sheet P is located at the recording position A need not be executed based on the signal output from the sensor but may be executed in another method. For example, the determination may be executed based on calculation of parameters such as a timing of start of driving of the conveying motor and a speed of driving of the conveying motor.

The construction of the conveying mechanism is not limited to the above-described one including the roller pair which is rotated while nipping the recording medium. The conveying mechanism may include a belt which runs while supporting the recording medium on its surface.

The recording device is not limited to the line recording device and may be a serial recording device. The recording device is not limited to the ink-jet recording device and may be a laser or thermal recording device, for example. The recording apparatus may include any number of recording devices. That is, the recording apparatus may include a plurality of recording devices instead of a single recording device. The recording medium is not limited to the sheet and may be a cloth, for example. The recording apparatus is not limited to the printer and may be any of a facsimile, a copying machine, and a multi-function peripheral (MFP), for example.

What is claimed is:
1. A recording apparatus, comprising:
a recording device configured to record an image on a recording medium;
a conveying mechanism configured to convey the recording medium such that the recording medium passes through a recording position at which the recording device records an image on the recording medium;
a drive source configured to drive the conveying mechanism;
a storage configured to store (i) image data to be managed on a page-by-page basis and representative of images to be respectively recorded on recording media by the recording device and (ii) the number of recording pages which is the number of pages for which the images are recorded on the recording media by the recording device; and a controller configured to:
decrease the number of recording pages which is stored in the storage, in response to completion of recording on the recording medium by the recording device on the page-by-page basis;
increase the number of recording pages which is stored in the storage, in response to an increase in an amount of the image data stored in the storage, on the page-by-page basis;
determine whether the number of recording pages which is stored in the storage is greater than or equal to a first number, the first number being a natural number greater than or equal to two;
control the drive source to convey the recording medium at a first speed and control the recording device to perform recording on the recording medium when the controller determines that the number of recording pages is less than the first number; and
control the drive source to convey the recording medium at a second speed greater than the first speed and control the recording device to perform the recording on the recording medium when the controller determines that the number of recording pages is greater than or equal to the first number,
wherein the controller is configured to detect whether the recording medium conveyed by the conveying mechanism is located at the recording position,
wherein in a case where the number of recording pages changes, from a value less than the first number to a value greater than or equal to the first number, at a time when the recording medium is located at the recording position, the controller is configured to control the drive source to switch a speed of conveyance from the first speed to the second speed in response to detection that the recording medium has been conveyed from the recording position and absent at the recording position, and
wherein, in a case where the recording device has performed the recording on the recording medium conveyed at the second speed based on a determination that the number of recording pages as remaining recording pages to be recorded based on the image data is greater than or equal to the first number, and even when, after completion of the recording on the recording medium by the recording device, the number of remaining recording pages is less than the first number, the controller is configured to control the drive source to convey a subsequent recording medium at the second speed and control the recording device to perform the recording on the subsequent recording medium.

2. The recording apparatus according to claim 1, wherein the controller is configured to decrement the number of recording pages which is stored in the storage, by one each time the recording on the recording medium by the recording device is completed on the page-by-page basis.

3. The recording apparatus according to claim 1, wherein the controller is configured to control the drive source to convey the recording medium at the second speed and control the recording device to perform the recording on the recording medium when the controller determines that the number of recording pages becomes less than the first number and does not become zero in response to the decrease in the number of recording pages.

4. The recording apparatus according to claim 3, wherein the controller is configured to control the drive source to convey the recording medium at the first speed and control the recording device to perform recording on the recording medium when the controller determines that the number of recording pages becomes zero in response to the decrease in the number of recording pages, and thereafter the controller determines that the number of recording pages is not greater than or equal to the first number.

5. The recording apparatus according to claim 1, further comprising an image processor,
wherein the image data stored in the storage is data for which image processing has been executed by the image processor.

6. The recording apparatus according to claim 1,
wherein the recording device comprises a facing surface which faces the recording medium passing through the recording position, and
wherein the facing surface is elongated in a direction perpendicular to a conveying direction in which the recording medium is conveyed when the recording medium conveyed by the conveying mechanism passes through the recording position.

7. A non-transitory storage medium storing a plurality of instructions to be executed by a processor of a recording apparatus, the recording apparatus comprising:
a recording device configured to record an image on a recording medium;
a conveying mechanism configured to convey the recording medium such that the recording medium passes through a recording position at which the recording device records an image on the recording medium;
a drive source configured to drive the conveying mechanism; and
a storage configured to store (i) image data to be managed on a page-by-page basis and representative of images to be respectively recorded on recording media by the recording device and (ii) the number of recording pages which is the number of pages for which the images are recorded on the recording media by the recording device,
the plurality of instructions, when executed by the processor, causing the recording apparatus to perform:
decreasing the number of recording pages which is stored in the storage, in response to completion of recording on the recording medium by the recording device on the page-by-page basis;
increasing the number of recording pages which is stored in the storage, in response to an increase in an amount of the image data stored in the storage, on the page-by-page basis;
determining whether the number of recording pages which is stored in the storage is greater than or equal to a first number that is a natural number and is greater than or equal to two;
causing the drive source to convey the recording medium at a first speed and causing the recording device to perform recording on the recording medium when the number of recording pages is less than the first number; and
causing the drive source to convey the recording medium at a second speed greater than the first speed and causing the recording device to perform the recording on the recording medium when the number of recording pages is greater than or equal to the first number,
in a case where the number of recording pages changes, from a value less than the first number to a value greater than or equal to the first number, at a time when the recording medium is located at the recording position, causing the drive source to switch a speed of conveyance from the first speed to the second speed in response to detection that the recording medium has been conveyed from the recording position and is absent at the recording position, and in a case where the recording device has performed the recording on the recording medium conveyed at the second speed based on a determination that the number of recording pages as a remaining recording pages to be recorded based on the image data is greater than or equal to the first number, and even when, after completion of the recording on the recording medium by the recording device, the number of remaining recording pages is less than the first number, controlling the drive source to convey a subsequent recording medium at the second speed and control the recording device to perform the recording on the subsequent recording medium.

* * * * *